US011044008B2

(12) United States Patent
Ravishankar et al.

(10) Patent No.: US 11,044,008 B2
(45) Date of Patent: Jun. 22, 2021

(54) SYSTEMS FOR MITIGATING SERVICE INTERRUPTS IN SATELLITE SYSTEMS

(71) Applicant: Hughes Network Systems, LLC, Germantown, MD (US)

(72) Inventors: Channasandra Ravishankar, Clarksburg, MD (US); John Corrigan, Germantown, MD (US); Deepak Arur, Vienna, VA (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/719,748

(22) Filed: Dec. 18, 2019

(65) Prior Publication Data

US 2020/0204250 A1 Jun. 25, 2020

Related U.S. Application Data

(60) Provisional application No. 62/782,327, filed on Dec. 19, 2018, provisional application No. 62/886,854, filed on Aug. 14, 2019.

(51) Int. Cl.
*H04B 7/185* (2006.01)
*H04W 36/00* (2009.01)

(52) U.S. Cl.
CPC .. *H04B 7/18541* (2013.01); *H04W 36/00835* (2018.08); *H04W 36/00837* (2018.08)

(58) Field of Classification Search
CPC .......... H04B 7/18541; H04B 7/18513; H04W 36/00837; H04W 36/00835; H04W 36/08
See application file for complete search history.

(56) References Cited

U.S. PATENT DOCUMENTS

| | | | |
|---|---|---|---|
| 5,946,603 A | 8/1999 | Ibanez-Meier et al. | |
| 6,138,012 A * | 10/2000 | Krutz | H04B 7/18513 455/272 |
| 2006/0119509 A1* | 6/2006 | Wang | H01Q 1/125 342/359 |
| 2017/0085314 A1* | 3/2017 | Davis | H04B 7/18513 |
| 2017/0230104 A1 | 8/2017 | Purkayastha et al. | |
| 2018/0203127 A1* | 7/2018 | Takewa | G01S 19/243 |
| 2018/0376393 A1* | 12/2018 | Wu | H04W 36/18 |
| 2019/0342794 A1* | 11/2019 | Tatum | H04W 28/08 |

FOREIGN PATENT DOCUMENTS

| | | |
|---|---|---|
| GB | 2432458 A | 5/2007 |
| WO | 99/57824 A2 | 11/1999 |

OTHER PUBLICATIONS

International Search Report and Written Opinion for PCT/US2019/067407 dated Apr. 21, 2020, all pages.

* cited by examiner

*Primary Examiner* — Julio R Perez
(74) *Attorney, Agent, or Firm* — Kilpatrick Townsend & Stockton LLP

(57) ABSTRACT

Embodiments disclosed herein relate generally to techniques for mitigating blockages associated with satellite systems. More specifically, techniques disclosed herein, describe solutions for minimizing service interruption during satellite handover. One or more blockages associated with one or more user terminals that connect to a satellite system may be determined by various means. Utilizing those blockages, handover times for the one or more user terminals may be determined such that service interrupts may be minimized.

17 Claims, 11 Drawing Sheets

SYSTEMS FOR MITIGATING SERVICE INTERRUPTS IN SATELLITE SYSTEMS

PRIORITY APPLICATIONS

This applications claims priority under 35 U.S.C. 119(e) to U.S. Provisional Application 62/782,327 filed on Dec. 19, 2018, entitled "SOLUTIONS FOR BLOCKAGE IN LEO/MEO SATELLITE SYSTEMS" and U.S. Provisional Application 62/886,854 filed on Aug. 14, 2019, entitled "SOLUTIONS FOR MITIGATING BLOCKAGE IN LEO/MEO SATELLITE SYSTEMS" both of which are hereby incorporated by reference for all purposes.

BACKGROUND OF THE INVENTION

Satellite communication systems are widely utilized as the backbone for different types of services. For example, satellites may be utilized to provide a telecommunication network (e.g., a phone network) to communities where it may be impractical to lay land lines. In another example, satellites can be used as part of a navigation network (e.g., Global Positioning System) in order to provide mobile devices with accurate location information. However, because satellites are located in space and orbit the Earth, views from user terminals to one or more satellites may be obstructed at one time or another. These blockages may result in interruption of one or more satellite-based services. Therefore, there is a need to mitigate blockage effects and the duration of interruptions associated with satellite communication systems.

BRIEF SUMMARY OF THE INVENTION

Various embodiments involving handover of user terminals within a satellite system are described. In some embodiments, a method for initiating handover of a user terminal may include identifying a first user terminal of a set of user terminals. The method may further include determining first blockage data associated with the first user terminal, the first blockage data being associated with a physical structure. The method may further include identifying a first satellite of a set of satellites. The method may further include determining first satellite data associated with the first satellite, the first satellite data comprising at least satellite location information. The method may further include identifying a second satellite of the set of satellites. The method may further include determining second satellite data associated with the second satellite, the second satellite data comprising at least satellite location data, wherein the first satellite and second satellite are part of the same satellite network. The method may further include determining, based at least in part on the first blockage data the first satellite data and the second satellite data, a handover time to initiate a handover from the first satellite to the second satellite. The method may further include causing the first user terminal to initiate a satellite handover at the handover time.

In one embodiment, the set of user terminals are connected to the physical structure. In one embodiment, the first blockage data comprises one or more blockage angles, wherein a blockage angle indicates an azimuth value and an elevation value associated with the physical structure. In one embodiment, the first blockage data comprises one or more blockage angles, wherein a blockage angle indicates a pitch value, a yaw value, or a roll value associated with the physical structure. In one embodiment, the first blockage data comprises a bitmap indicating one or more obstructions with respect to one or more azimuth values and one or more elevation values associated with the physical structure.

In one embodiment, the method may further include identifying a second user terminal of the set of user terminals. The method may further include determining second blockage data associated with the second user terminal, the second blockage data being associated with the physical structure. The method may further include determining based at least in part on the handover time and the second blockage data, a second handover time to initiate a handover from the first satellite to the second satellite, wherein the second handover time is different from the handover time. The method may further include causing the second user terminal to initiate a satellite handover at the second handover time.

In one embodiment, determining, based at least in part on the handover time and the second blockage data, a second handover time to initiate a handover from the first satellite to the second satellite, wherein the second handover time is different from the handover time further comprises generating a combined bitmap indicating one or more obstructions associated with the first user terminal and the second user terminal. The method may further include determining, based at least in part on the combined bitmap, a first accessibility data associated with the first user terminal and the first satellite and a second accessibility data associated with the second user terminal and the first satellite. The method may further include identifying, based at least in part on the first accessibility data and the second accessibility data, a time period when the first satellite is accessible to the first user terminal and the first satellite is not accessible to the second user terminal. The method may further include determining, based at least on the time period, the second handover time. In one embodiment, the method may further include, identifying, based at least in part on the first accessibility data and the second accessibility data, a third satellite that is accessible to the first user terminal when the first satellite or second satellite is not accessible to the first user terminal.

BRIEF DESCRIPTION OF THE DRAWINGS

Features, embodiments, and advantages of the present disclosure are better understood when the following Detailed Description is read with reference to the accompanying drawings.

DETAILED DESCRIPTION OF THE INVENTION

Figure 1:
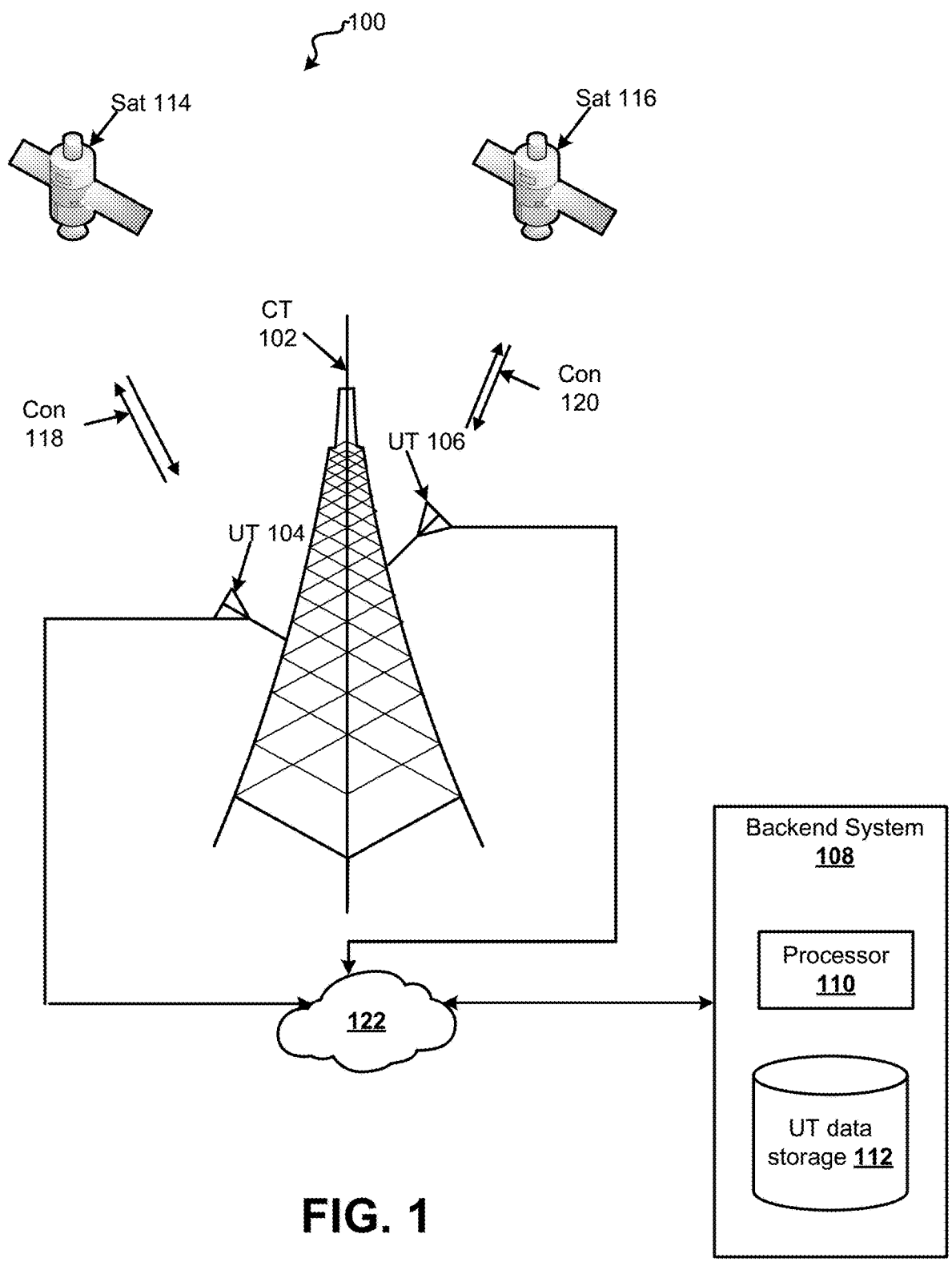
FIG. 1 illustrates an example network in accordance with one or more embodiments described herein.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration". Any embodiment or design described herein as "exemplary" is not necessarily to be construed as preferred or advantageous over other embodiments or designs.

Embodiments disclosed herein relate generally to techniques for mitigating blockages associated with satellite systems. More specifically, techniques disclosed herein, describe solutions for minimizing service interruption during satellite handover. One or more user terminals (UTs) may be physically mounted to a cell tower. The UTs may comprise antennas that receive and transmit signals to one or more overhead satellites. Consumer devices, such a cellular phones, may connect to one or more UTs in order to access one or more services provided by a satellite network, such as a telecommunication service (e.g., phone and internet services) or a location service (e.g., GPS). Because satellites orbit the Earth and the Earth rotates, a UT may have to switch connections (i.e., handover) between multiple satellites in order to maintain a connection to the satellite network. During a handover process, the UT may not have access to the satellite network, which causes any consumer devices connected to the UT to lose access to the satellite network. Furthermore, in some instances one or more UTs servicing the same coverage area may undergo a handover process at the same time, which may result in a lapse of service for a whole coverage area. To implement block mitigation and an intelligent handover process, blockage data may be utilized to determine appropriate times for a UT to initiate a handover process.

In order to determine when one or more UTs should initiate a handover process, blockage data is utilized. Blockage data may be determined based on a UT's location within respect to a cell tower (or other physical structure obstruction), the cell tower geometry, one or more satellite locations, and in the case of a moving cell tower (e.g., marine), roll values, pitch values, and yaw values. Blockage data may indicate line of sight issues between a particular UT and one or more satellites. For example, if a UT is mounted facing east the cell tower itself may block one or more viewing angels to the west. In such an example, there may be a particular angle (i.e., blockage angle), according to a set of azimuth and elevation values, where the cell tower blocks the UT's line of sight to the sky. As a result, as one or more satellites moves into the line of sight associated with that blocked viewing angle (i.e., blockage angle) that particular UT may not be able to communicate with the satellite network. Such a result is particularly problematic if another UT is undergoing a handover process at the same time. This will result in multiple UTs being unavailable at the same time.

Blockage data may be utilized to determine a blockage map associated with a UT. A blockage map may be a bitmap that indicates one or more obstructions associated with a UT. The blockage map may indicate particular azimuth and elevation values where a UT may have a line of sight obstruction to one or more satellites. Furthermore, multiple blockage maps may be combined to indicate particular areas where two or more UTs may simultaneously be blocked from the satellite network due to one or more objects obstructing the two or more UTs line of sight to the sky. In one embodiment, blockage maps for a particular UT may be generated by the UT itself. By utilizing a UT to generate a blockage map, processing requirements for a backend system may be reduced. In one embodiment, blockage maps for a particular UT may be generated by a backend system. By utilizing a backend system to generate a blockage map, processing requirements and size for a UT may be reduced.

Once a blockage map is generated for one or more UTs, it can be determined when to initiate a handover sequence. Satellite location information may be utilized in combination with one or more blockage maps to determine (a) when a UT will be blocked from the satellite network and (b) when one or more satellites will be in line of sight by the UT. This information may be determined for multiple UTs in a particular coverage area (e.g., UTs connected to the same cell tower). Based on this information, the UTs within a particular coverage area may be controlled such that a service interruption associated the satellite network may be minimized. For example, a first UT may initiate a handover from a first satellite to a second satellite at a first time, while a second UT may initiate a handover from the first satellite to the second satellite at a second time that is later than the first because one or more blockages associated with the first UT.

The techniques described herein are an improvement over existing satellite handover technologies. In current systems, it is expected that when multiple UTs are mounted to a cell tower or a marine structure, the next satellite for each UT will arrive at the same time and the time of the satellite handover, for multiple UTs, will be nearly identical. Having identical satellite handovers for multiple UTs within the same coverage area will result in a service interrupt. Such a service interruption is mitigated by the handover techniques disclosed herein, which may determine when one or more UTs initiate a handover process based on blockage data associated with each UT and satellite location information associated with one or more satellites in a satellite network.

FIG. 1 illustrates an example network 100 in accordance with one or more embodiments described herein. Network 100 comprises cell tower 102, UTs 104-106, backend system 108, satellites 114-116, satellite connections 118-120, and network 122. Cell tower 102 may be an eNodeB (eNB), a base transceiver station (BTS), and the like. Cell tower 102, via UTs 104-106, may facilitate communication between one or more consumer devices, such as mobile phones, and satellites 114-116. UTs 104-106 may be devices capable of transmitting and receiving signals from satellites 114-116, via satellite connections 118-120.

UTs 104-106 may comprise a communication antenna, one or more processors, and one or more modems. The communication antenna may transmit radio waves to satellites 114-116 and receive radio waves from satellites 114-116. One or more processors may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD). The one or more modems may comprise a piece of computer hardware that enables communication via one or more cellular broadband mechanisms (e.g., 3G, 4G, 5G, and the like). One or more consumer devices may access a satellite network comprising satellites 114-116 by utilizing UTs 104-106.

Backend system 108 comprises processor 110 and UT data store 112. In one embodiment, backend system 108 may be referred to as a ground node (GN). Backend system 108 may provide processing and data storage features for cell tower 102. In one embodiment, backend system 108 is integrated into cell tower 102. Processor 110 may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD). UT data store 112 may store information associated with one or more UTs. For example, UT data store 112 may comprise blockage data, blockage angles (including azimuth and elevation values), blockage maps, grouping indicators, temporary indicators, and the like. A grouping indicator may indicate a logical UT which one or more UTs belong to. A group of Internet Protocol (IP) addresses associated with a group of UTs (e.g., a group of UTs connected to the same cell tower) may be received by backend system 108. Backend system 108, may then, via processor 110, map identifiers (e.g., cell Radio Network Temporary Identifier (c-RNTI)) associated with each UT in the group of UTs to corresponding IP addresses and to the grouping indicator. Once one or more UTs are grouped into a logical UT, radio bearers associated with each UT (that make up the logical UT) may be utilized simultaneously. By simultaneously using multiple radio bearers associated with different UTs, an increase in throughput may be achieved as opposed to simply utilizing the radio bearers associated with UTs separately.

Satellites 114-116 may comprise any satellite that is located in orbit of a planet and that is capable of receiving and transmitting radio waves. Satellites 114-116 may be a part of a satellite network. Such a satellite network may include satellites in Low Earth Orbit (LEO), Medium Earth Orbit (MEO), and/or Geostationary orbit (GEO). The satellite network may provide, in combination with other elements of network 100, one or more functions such as telecommunications (e.g., 3G, 4G, and 5G), location services (e.g., GPS), and the like.

UTs 104-106 may communicate with satellites 114-116 via satellite connections 118-120. Satellite connections 118-120 may be line of sight connections. UTs 104-106 may need to have a clear line of sight to one or more of satellites 114-116 in order to connect to the satellite network. Several physical obstructions, such as cell tower 102, may impede a clear line of sight from UTs 104-106 to satellites 114-116. For example, as satellites 114-116 rotate, there are certain areas where UT 106 may not have direct line of sight to either satellite. In such an instance, there may be a service interruption.

Network 122 connects cell tower 102 and UTs 104-106 to backend system 108. In one embodiment, network 122 may be implemented by a wired or wireless connection, such as but not limited to a personal area network (PAN), local area network (LAN), wide area network (WAN), and the like. In one embodiment, backend system 108 may be in close proximity or apart of cell tower 102. Backend system 108 may transmit instructions, that when executed by one or more processors associated with UTs 104-106, cause one more of UTs 104-106 to initiate a satellite handover process.

Figure 2:
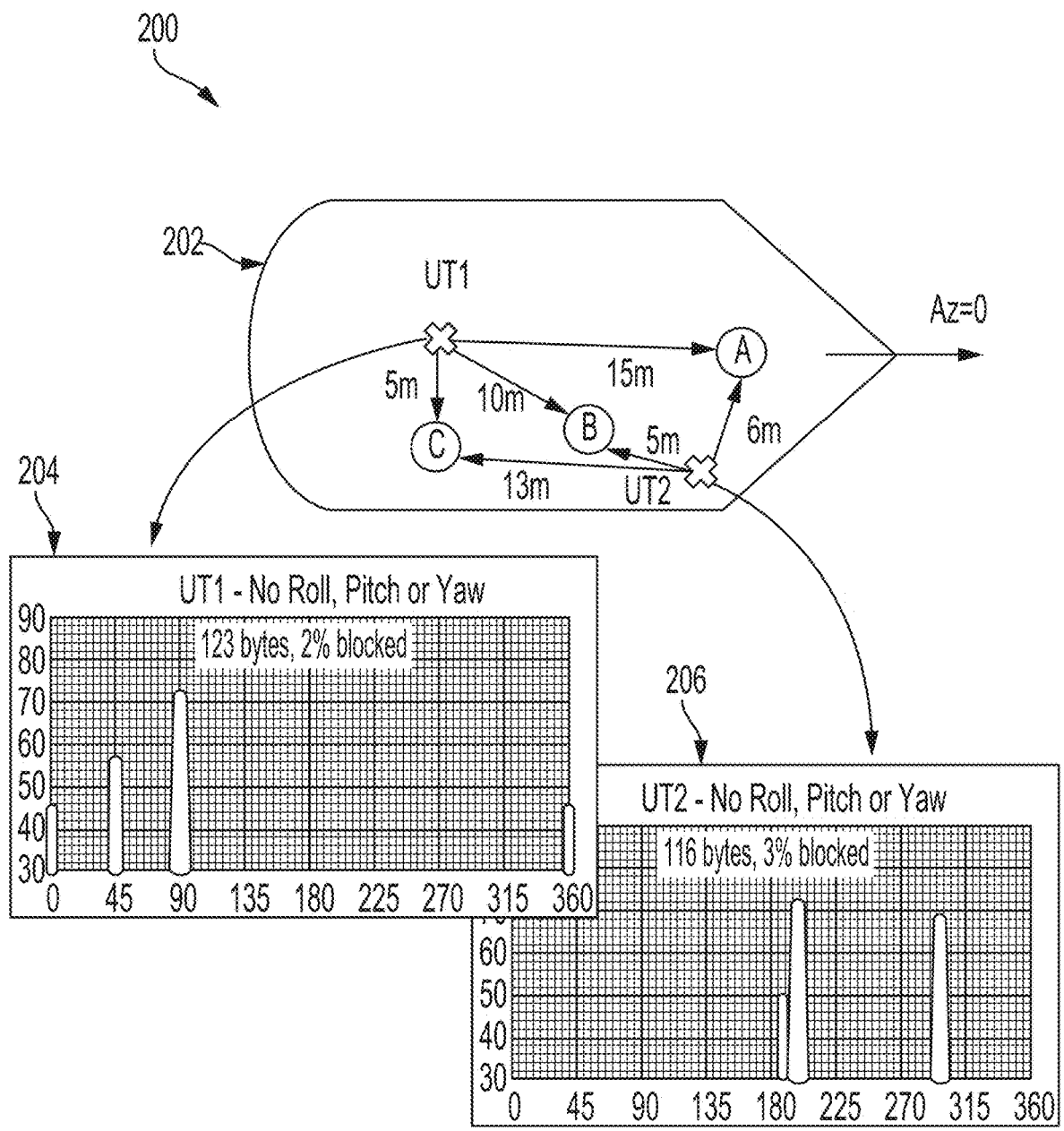
FIG. 2 illustrates an example blockage system in accordance with one or more embodiments described herein.

FIG. 2 illustrates an example blockage system 200. Blockage system 200 comprises blockage diagram 202 and blockage maps 204 and 206. Blockage diagram 202 may be a visual diagram depicting the relationships between one or more blockages and one or more UTs. Blockage diagram 202 may be generated by a backend system based on data received from one or more UTs. For example, a UT may perform an initial scanning process where it checks multiple viewing angels to determine if any of the viewing angles have an obstruction to a direct line of sight to the sky. Data from this scanning process may be send to the backend system and the backend system may generate blockage diagram 202. The data received by the backend system may include blockage data indicating information about one or more obstructions.

Blockage diagram 202 indicates there are 3 obstructions associated with UT1 and UT2, each. Blockage data associated with the UT1 obstructions include the following:

Obstruction A: azimuth value=0 degrees, height=15 meters, width=1 meter, and distance=15 meters.

Obstruction B: azimuth value=45 degrees, height=15 meters, width=1 meter, and distance=10 meters.

Obstruction C: azimuth value=90 degrees, height=15 meters, width=1 meter, and distance=5 meters.

Blockage data associated with the UT2 obstructions include the following:

Obstruction A: azimuth value=300 degrees, height=15 meters, width=1 meter, and distance=6 meters.

Obstruction B: azimuth value=200 degrees, height=15 meters, width=1 meter, and distance=5 meters.

Obstruction C: azimuth value=190 degrees, height=15 meters, width=1 meter, and distance=13 meters.

In one embodiment obstructions A, B, and C may be part of a cell tower that is physically connected to UT1 and UT2. In one embodiment, one or more of obstructions A, B, and C may be an obstruction that prevents direct line of sight to one or more satellites. In such an embodiment, obstruction A may be a tree, obstruction B may be a mountain, obstruction C may be building, and the like.

Based on the blockage data, the backend system may generate blockage map 204 associated with UT1 and blockage map 206 associated with UT2. The x-axis of a blockage map indicates the azimuth value and the y-axis of the blockage map indicates the elevation value associated with a particular obstruction. Blockage maps 204-206 may be for instances where UT1 and UT2 are stationary (e.g., no roll, pitch, or yaw). The closer an obstruction is, the higher the elevation angle is for the blockage. For example, in blockage map 204, obstruction C is at a distance of 5 meters and is the closest obstruction with respect to UT1. As a result, the blockage angle according to obstruction C indicates a greater elevation angle range than obstruction B which is twice as far away. The elevation value and the azimuth value within a blockage map may indicate a blockage angle associated with a particular UT. For example, UT2 may be blocked from direct line of sight of a satellite, when a satellite is at an azimuth angle of 200 degrees (with respect to UT2) and between elevation angles of 30 to approximately 72 degrees.

Blockage angles within a blockage map may be calculated by the following:

$$el_{max} = \tan^{-1}\left(\frac{h}{d}\right)$$

$$az_{max} = \tan^{-1}\left(\frac{w}{2d}\right)$$

$$az = \pm\tan^{-1}\left(\frac{w * \cos el\max}{2d}\right)$$

$el_{max}$ represents the maximum elevation angle (i.e., value) for a blockage. $az_{max}$ represents the maximum azimuth angle (i.e., value), and az represents an azimuth adjustment value. For example, height of an obstruction may be equal to 15 meters, width of an obstruction may be equal to 1 meter, distance to the obstruction may be equal 5 meters. The Minimum Elevation Angle (MEA) may be 30 degrees. The MEA indicates the lowest elevation angle above a horizon from which a satellite can provide service to a user terminal. As such, only blockages above the MEA are of interest. Because MEA is 30 degrees the following values may be calculated:

$$el_{max} = \tan^{-1}\left(\frac{15}{5}\right) = 71.56°$$

$$\text{At 30 degree elevation } az = \tan^{-1}\left(\frac{1 * \cos(30°)}{2 * 5}\right) = 4.95°$$

$$\text{At 71 degree elevation } az = \tan^{-1}\left(\frac{1 * \cos(71°)}{2 * 5}\right) = 1.86°$$

$$az_{max} = \tan^{-1}\left(\frac{1}{2 * 5}\right) = 5.71°$$

As a result, of the calculations azimuth ranges from ±approximately 5 degrees at an elevation of 30 degrees and ±approximately 1.9 degrees at an elevation of approximately 72 degrees. The plus/minus of the azimuth value represents the azimuth range of the blockage from −az through zero and to +az.

Blockage maps 204 and 206 also indicate the percent of the map that is blocked with respect to the size of the map. For example, blockage map 204 may be 123 bytes and blockages may represent 2.3% of the map. In another example, blockage map 206 may be 116 bytes and blockages may represent 3.2% of the map. By indicating a percentage of blockage (e.g., blockage angels), it may be easy to identify UTs that have a higher percentage of obstructions. If a UT has a high percent of obstructions (relative to its map size) it may indicate that the UT needs to be physically relocated in order to circumvent one or more obstructions.

In one embodiment, blockage map 204 may be generated by UT1 and blockage map 206 may be generated by UT2. UT1 may determine all of the blockage data associated with itself and instead of sending the blockage data to the backend system for further processing, UT1 may produce blockage map 204 itself. Similarly, UT2 may determine all of the blockage data associated with itself and instead of sending the blockage data to the backend system for further processing, UT2 may produce blockage map 206 itself. The individually computed blockage maps 204-206 may then be transmitted to the backend system. The backend system may then determine when to initiate a handover of UT1 and UT2 based on the received blockage maps.

Figure 3:
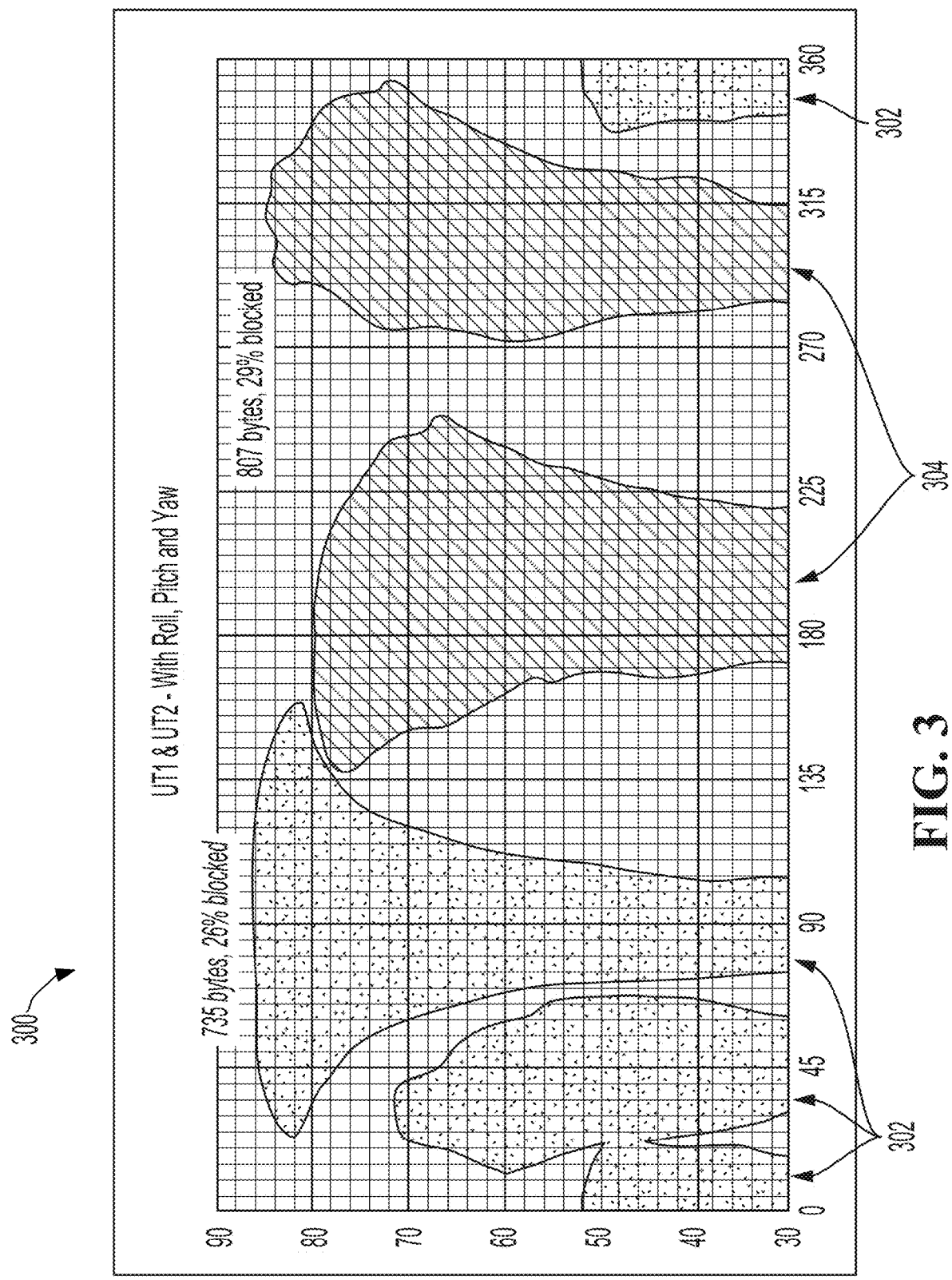
FIG. 3 illustrates a first blockage map in accordance with one or more embodiments described herein.

FIG. 3 illustrates blockage map 300 in accordance with one or more embodiments described herein. The backend system may generate blockage map 300 based on one or more blockage maps associated with different UTs. For example, blockage map 300 may be generated by combining blockage maps 204 and 206 as depicted in FIG. 2. Blockage map 300 may be further generated based on roll, pitch and yaw values. Roll, pitch, and yaw values cause blockage angles to extend over more of the visible sky. Pitch and roll may be damped oscillatory motions caused by various natural conditions (e.g., ocean waves, wind, and the like). Yaw may be a momentary variation around a desired direction due to steering corrections. Roll, pitch, and yaw values may be integrated into a blockage map when UTs are on a moving vessel such as a boat or ship. For example, blockage map 300 may be determined based on a 15 degree roll, a 7 degree pitch, and a 5 degree yaw. These roll, pitch, and yaw values may cause the blockage angles to expand as compared to when there are no roll, pitch and yaw values. In addition, blockage map 300 indicates a percentage of blockage associated with each UT. For example, the first UT (associated with blockage angles 302) may have a 26% blockage and the second UT (associated with blockage angles 304) may have a 29% blockage. The percentage of blockages may be determined based on the total amount of bytes blocked in blockage map 300. For example, blockage map 300 may comprise 2,826 bytes and the blockage angles associated with the first UT (i.e., blockage angles 302) may block 735 bytes or 26% of the bytes in blockage map 300. In another example, the blockage angles associated with the second UT (i.e., blockage angles 304) may block 807 bytes or 28.5% (rounded to 29%) of the bytes in blockage map 300. The percentage of blockages may indicate, to the backend system, that a location of one or more UTs may need to be changed to reduce the percentage of blockages associated with a particular UT.

Blockage map 300 may also indicate areas where multiple UTs have obstructions. For example, 302 may indicate blockage angles associated with a first UT and 304 indicates blockage angles associated with a second UT. Areas in which there are no blockage angles indicate instances where both the first and second UT have a clear light of sight to the sky and may potentially connect to the satellite network. By combining multiple blockage maps into a single blockage map, a backend system, may determine when particular UTs will have blockages with respect to another UT, which may aid in the determination of when one or more UTs initiated a handover process.

Figure 4:
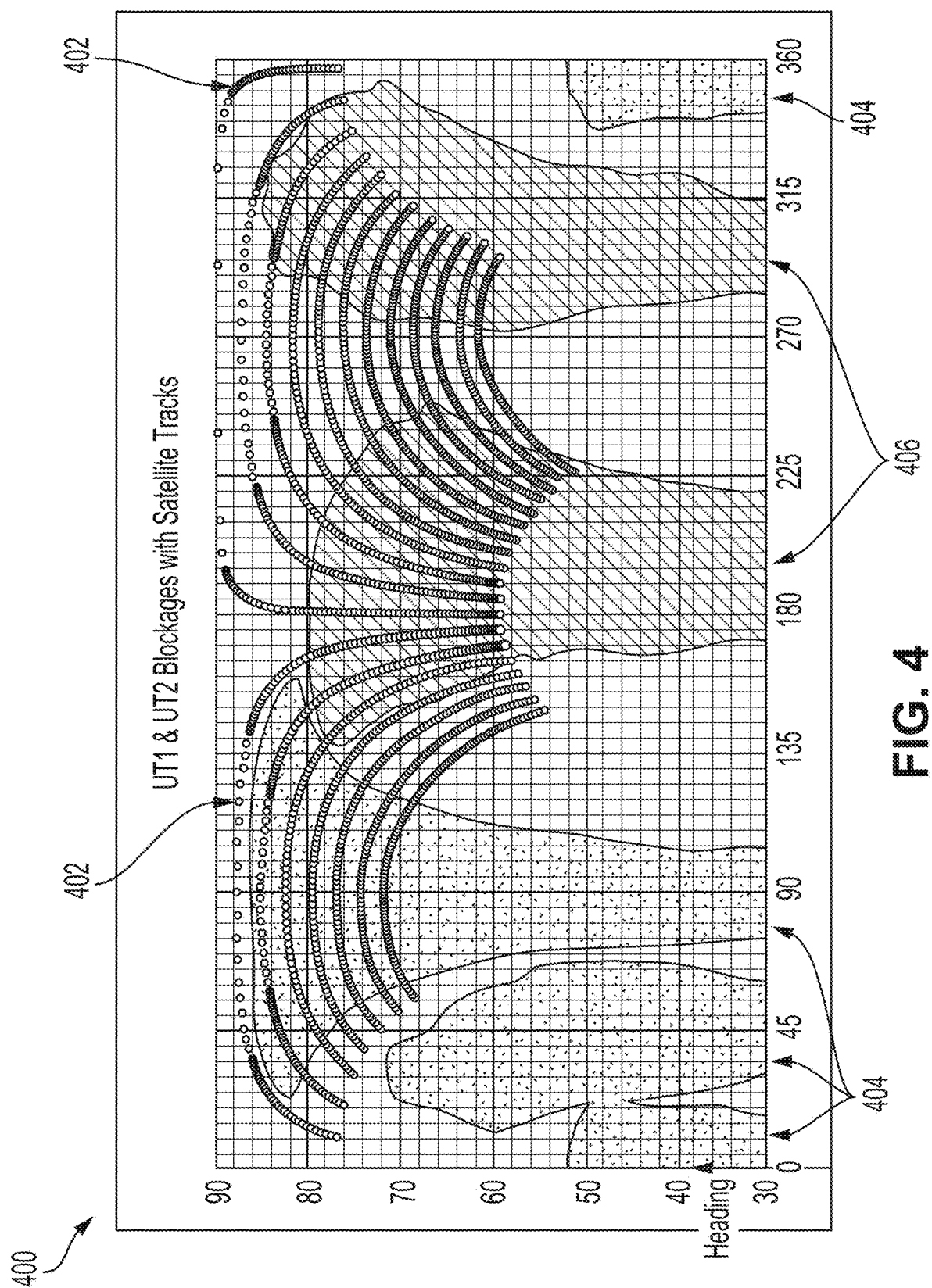
FIG. 4 illustrates a second blockage map in accordance with one or more embodiments described herein.

FIG. 4 illustrates blockage map 400 in accordance with one or more embodiments described herein. The backend system may generate blockage map 400 based on one or more blockage maps associated with different UTs and location information associated with one or more satellites. Blockage map 400 may be based upon a direction in which a moving vessel (e.g., a ship) is heading. Blockage map 400 may contain satellite tracks 402. Satellite tracks 402 may be determined based on satellite location information associated with one or more satellites. For example, the backend system may store, within memory, predetermined coordinates associated with one or more satellites. Each satellite of a satellite network may travel in a predetermined path as it orbits the Earth. These predetermined coordinates may be utilized to determine azimuth and elevation angles at which satellites will be viewable by particular UTs. A satellite is blocked where its satellite track intersects with a blockage angle indicated on blockage map 400. For example, 404 may represent blockage angles associated with a first UT and 406 may represent block angles associated with a second UT. In such an example, a satellite or satellite network may be blocked from a first UT at azimuth angle 90 and elevation angle 70. However, that same satellite or satellite network may be visible by first UT at azimuth angle 135 and elevation angle 70.

In one embodiment, blockage mitigation may be achieved by preventing satellite tracks 402 from intersecting with blockage angles associated with both the first and second UT at the same time. If a satellite track intersects a blockage angle of the first UT and a blockage angle of the second UT at the same instance (as indicated in a blockage map) then this indicates that both the first and second UT may be unable to communicate with a satellite network, which may cause an interruption in service. In one instance, if it is determined there is a location where a satellite track intersects blockage angles of both UTs at a given instance, one or more UTs may be physically moved in order to modify the blockage map such that no such intersection exists. For example, when installing one or more UTs, it may be possible to ensure blockage angles associated with terrestrial locations such as a cell tower never interest. However, in cases where blockage angels are due to location obstructions (e.g., mountains and trees) some overlap of blockage angles may be inevitable especially in which UTs are within a moving vehicle (e.g., a boat). In cases where blockage angle intersections are inevitable, additional UTs may be provided to provide an unblocked view of one or more satellites in order to prevent or at least mitigate service interruptions.

Figure 5:
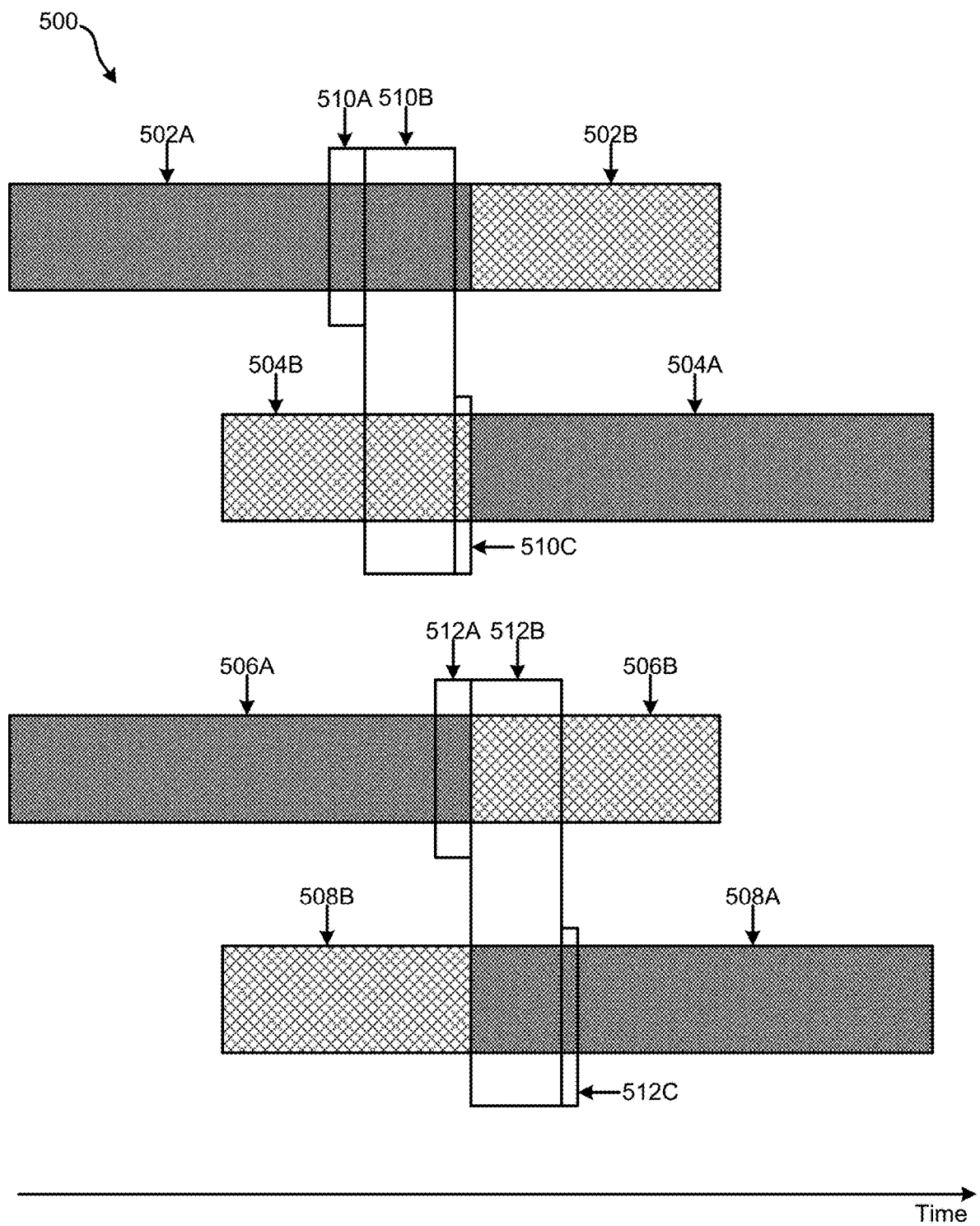
FIG. 5 illustrates a first handover system in accordance with one or more embodiments described herein.

FIG. 5 illustrates an example handover system 500 according to one or more embodiments described herein. The backend system (e.g., backend system 108 as illustrated in FIG. 1) may determine one or more aspects of handover system 500 based on blockage data and satellite location information. 502A represents a time period when a first satellite is available to a first UT. For example, 502A may represent a time period when the first UT has a direct line of sight to the first satellite. 502B represents a time period when the first satellite is not available to the first UT. For example, 502B may represent a time period where the first UT no longer has a direct line of sight to the first satellite. In such an example, 502B may be caused by the orbital movement of the first satellite. 504A may represent a time period when the first UT has a direct line of sight to a second satellite. For example, 504A may represent a time period when the first UT has a direct line of sight to the second satellite. 504B represents a time period when the second satellite is not available to the first UT. For example, 504B may represent a time period when the first UT no longer has a direct line of sight to the second satellite. In such an example, 504B may be caused by the orbital movement of the second satellite. In one embodiment, 502A-502B may be determined based on satellite location information. The satellite location information may indicate a satellite's location at different points in time as the satellite's orbital movement. The satellite location information along with blockage data associated with the first UT can be utilized to determine when a first satellite is in the direct line of sight of the first UT and thus 502A-502B may be determined. Similarly, 504A-504B may be determined based on satellite location information associated with the second satellite and blockage data associated with the first UT.

A handoff for the first UT between satellites is depicted by 510A, 510B, and 510C. 510A represents a first time period where pre-handover Radio Resource Control (RRC) Reconfiguration signaling is performed. 510B represents a second time period where retracement and acquisition of data associated with the second satellite is performed. 510C represents a third time period where post-handover RRC Reconfiguration signaling is performed. All together 510A-510C represent time to start and complete a handover from a first satellite to a second satellite. During one or more parts of the handover process, the first UT may be unavailable (i.e., not connected to a satellite and thus not connected to the satellite network). For example, during 510B, the first UT may be unavailable. During this time, any consumer device connected to the first UT may experience a service interruption. In one embodiment, a successful handover requires the first satellite to be available during 510A and the second satellite to be available during 510C otherwise the handover may fail and the first UT will go into a Radio Link Failure (RLF) state. When in an RLF, the first UT will be unavailable for a period of time and thus any consumer device connected to the first UT will suffer a service interruption.

506A-506B represent time periods associated with respect to a second UT. The first and second UT may be part of the same coverage area and/or attached to the same cell tower. 506A represents a time period when the first satellite is available to the second UT. For example, 506A may represent a time period when the second UT has a direct line of sight to the first satellite. 506B represents a time period when the first satellite is not available to the second UT. For example, 506B may represent a time period where the second UT no longer has a direct line of sight to the first satellite. In such an example, 506B may be caused by orbital movement of the first satellite. 508A may represent a time period when the second UT has a direct line of sight to the second satellite. 508B represents a time period when the second satellite is not available to the second UT. For example, 508B may represent a time period when the second UT no longer has a direct line of sight to the second satellite. In such an example, 508B may be caused by the orbital movement of the second satellite. In one embodiment, 506A-506B may be determined based on satellite location information. The satellite location information may indicate a satellite's location at different points in time according to a satellite's orbital movement. The satellite location information along with blockage data associated with the second UT can be utilized to determine when a first satellite is in the direct line of sight of the second UT and thus 506A-506B may be determined. Similarly, 508A-508B may be determined based on satellite location information associated with the second satellite and blockage data associated with the second UT.

A handoff for the second UT between satellites is depicted by 512A, 512B, and 512C. 512A represents a first time period where pre-handover RRC Reconfiguration signaling is performed. 512B represents a second time period where retracement and acquisition of data associated with the second satellite is performed. 512C represents a third time period where post-handover RRC Reconfiguration signaling is performed. All together 512A-512C represent time to start and complete a handover from a first satellite to a second satellite. During one or more parts of the handover process, the second UT may be unavailable (i.e., not connected to a satellite and thus not connected to the satellite network). For example, during 512B, the second UT may be unavailable. During this time, any consumer device connected to the second UT may experience a service interruption. In one embodiment, a successful handover requires the first satellite to be available during 512A and the second satellite to be available during 512C otherwise the handover may fail and the second UT will go into a RLF state.

The backend system may determine 510A-510C and 512A-512C to minimize a service interrupt in a coverage area serviced by both the first UT and the second UT. As shown in handover system 500, 510C ends for the first UT prior to (or just as) 512B begins for the second UT. At 512B, the second UT will be without service, thus the handover process for the first UT (i.e., start of 510A) is scheduled such that the first UT will be connected to the second satellite prior to the second UT becoming unavailable. Similarly, 512A is scheduled such that the second UT is available, via a connection to the first satellite, while the first UT is in time period 510B (during which the first UT is unavailable). When UTs outages don't overlap (i.e., 510B and 512B) then retrace mitigation may be achieved during satellite handover.

Figure 6:
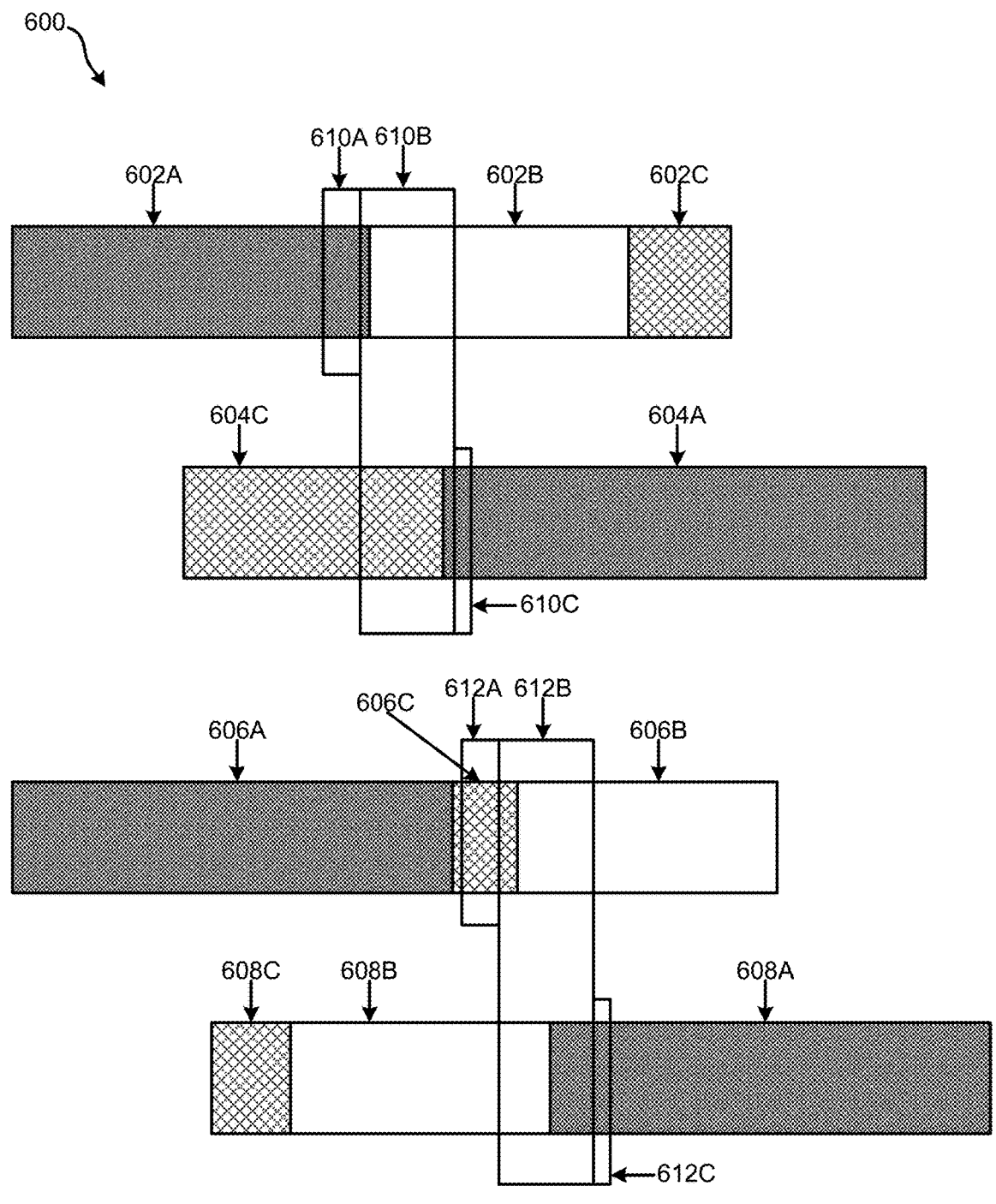
FIG. 6 illustrates a second handover system in accordance with one or more embodiments described herein.

FIG. 6 illustrates handover system 600 according to one or more embodiments described herein. The backend system (e.g., backend system 108 as illustrated in FIG. 1) may determine one or more aspects of handover system 600 based on blockage data and satellite location information. 602A represents a time period when a first satellite is available to a first UT. 602B represents a time period when the first satellite will be blocked by one or more obstructions based on blockage data associated with the first UT. For example, 602B may represent a time period where the first satellite is behind a tree that is obstructing the view of the first UT. 602C may represent a time period where the first satellite is unavailable to the first UT. For example, 602C may be caused by the orbital movement of the first satellite.

604A may represent a time period when the first UT has a direct line of sight to a second satellite. 604C represents a time period when the second satellite is not available to the first UT. For example, 604C may represent a time period when the first UT no longer has a direct line of sight to the second satellite due to the orbital movement of the second satellite. In one embodiment, 602A-602C may be determined based on satellite location information. The satellite location information may indicate a satellite's location at different points in time as the satellite orbits. The satellite location information along with blockage data associated with the first UT can be utilized to determine when a first satellite is in the direct line of sight of the first UT (i.e., 602A), when the first satellite is blocked by one or more obstructions associated with the first UT (i.e., 602B), or when the first satellite has moved out of sight of the first UT (i.e., 602C).

A handoff for the first UT between satellites is depicted by 610A, 610B, and 610C. 610A represents a first time period where pre-handover RRC Reconfiguration signaling is performed. 610B represents a second time period where retracement and acquisition of data associated with a second satellite is performed. 610C represents a third time period where post-handover RRC Reconfiguration signaling is performed. All together 610A-610C represent time to start and complete a handover from a first satellite to a second satellite.

606A-606C represent time periods associated with respect to a second UT. The first and second UT may be part of the same coverage area and/or attached to the same cell tower. 606A represents a time period when the first satellite is available to the second UT. For example, 606A may represent a time period when the second UT has a direct line of sight to the first satellite. 606B represents a time period when the first satellite will be blocked by one or more obstructions based on blockage data associated with the second UT. For example, 606B may represent a time period where the first satellite is behind a building that is obstructing the view of the second UT. 606C represents a time period when the first satellite is not available to the second UT. For example, 606C may represent a time period where the second UT no longer has a direct line of sight to the first satellite. In such an example, 606C may be caused by orbital movement of the first satellite.

608A may represent a time period when the second UT has a direct line of sight to the second satellite. 608B represents a time period when the second satellite will be blocked by one or more obstructions based on blockage data associated with the second UT. For example, 608B may represent a time period where the second satellite is behind a cell tower that is obstructing the view of the second UT. 608C represents a time period when the second satellite is not available to the second UT. In one embodiment, 606A-606C may be determined based on satellite location information. The satellite location information may indicate a satellite's location at different points in time based on a satellite's predetermined orbital movement. The satellite location information along with blockage data associated with the second UT can be utilized to determine when a first satellite is in the direct line of sight of the second UT and thus 606A-606C may be determined. Similarly, 608A-608C may be determined based on satellite location information associated with the second satellite and blockage data associated with the second UT.

A handoff for the second UT between satellites is depicted by 612A, 612B, and 612C. 612A represents a first time period where pre-handover RRC Reconfiguration signaling is performed. 612B represents a second time period where retracement and acquisition of data associated with the second satellite is performed. 612C represents a third time period where post-handover RRC Reconfiguration signaling is performed. All together 612A-612C represent time to start and complete a handover from a first satellite to a second satellite.

The backend system may modify the initiation of handovers of the first UT and the second UT to mitigate service interrupts. In handover system 600, the backend system initiates the handover of the first UT while the first satellite is still available (i.e., early handover) because of blockage data associated with the first UT and satellite availability for the second UT. The blockage data (e.g., blockage map) associated with the first UT may indicate to the backend system that although the first satellite may be overhead, the first UT may not have a direct line of sight to the first satellite due to one or more obstructions. In addition, the backend system may initiate the handover of the second UT (i.e., 612A) once the first UT has connected to the second satellite (i.e., 610). By starting the handover process of the second UT after the first UT has connected to the second satellite (i.e., 610C) an interruption of service may be at least partially mitigated. In addition, because outage gaps (i.e., 610B and 612B) do not overlap retrace mitigation is achieved.

Figure 7:
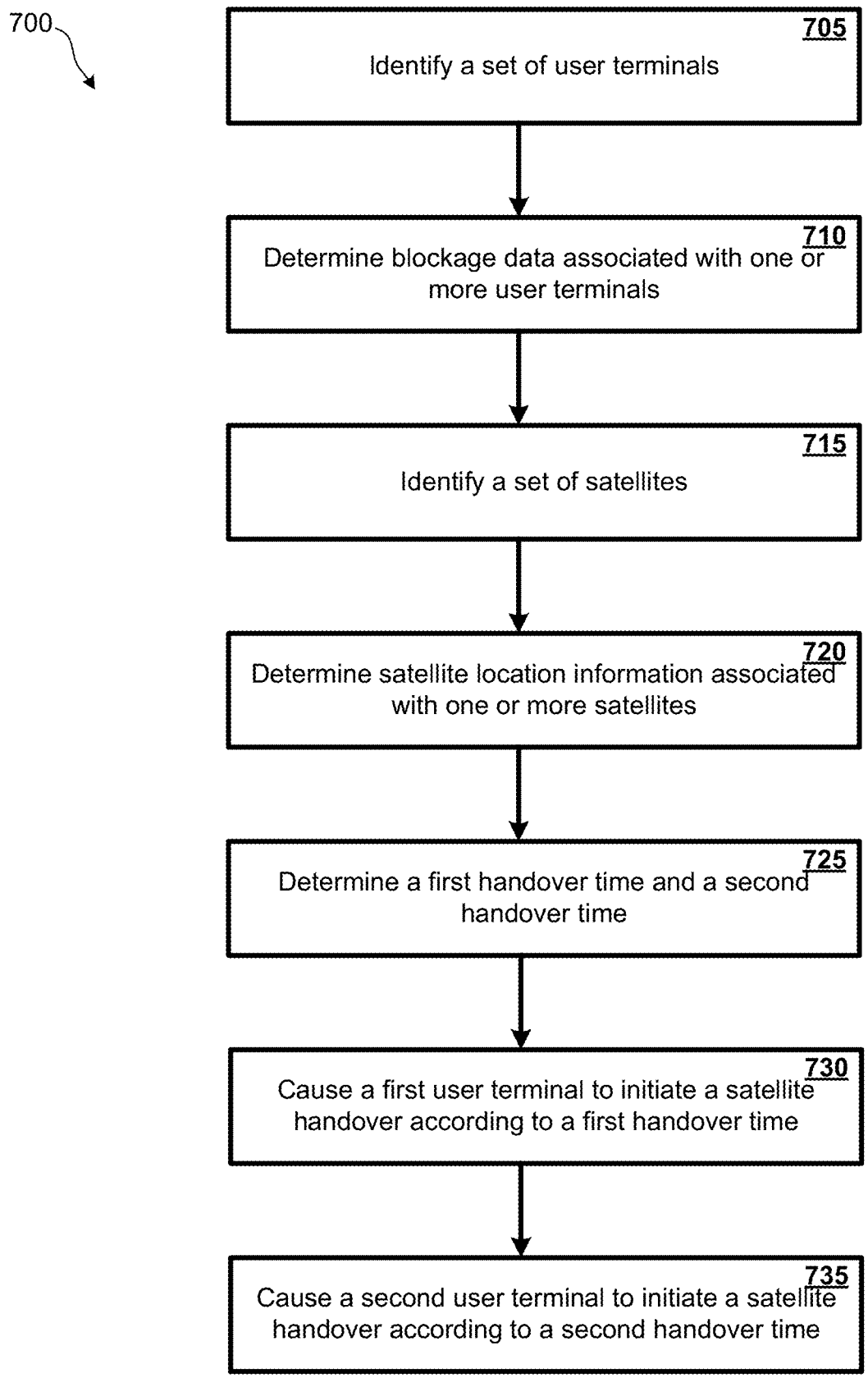
FIG. 7 illustrates a first process in accordance with one or more embodiments described herein.

FIG. 7 depicts example process 700 in accordance with one or more embodiments disclosed herein. Process 700 is a process for initiating a satellite handover for one or more devices in order to mitigate service interruptions. One or more aspects of process 700 may be performed by a backend system associated with one or more UTs. For example, backend system 108 as depicted in FIG. 1 may perform one or more aspects of process 700.

At 705, the backend system identifies a set of UTs. The set of UTs may be one or more physical UTs that are associated with a single logical UT. The logical UT may represent a set of UTs that service a first coverage area and/or that are physically attached to the same cell tower. In one embodiment, a logical identification is assigned to the set of user terminals that constitute a logical UT, such a logical identifier may be a Mobile Station International Subscriber Directory Number (MSISDN). Each UT may have its own Radio Network Temporary Identifier (RNTI). The backend system may associated the RNTI of each physical UT with the logical identifier in order to bind each physical UT to the logical identifier, thus creating a logical UT that represents a set of UTs.

In one embodiment, the logical UT may be established utilizing IP addresses of each of the UTs in the set of UTs. Each physical UT may have a unique IP address. Furthermore, each UT may have its own RNTI. The backend system may bind the IP address of a first UT with the RTNI of the first UT. Similarly, the backend system may bind the IP address of a second UT with the RTNI of the second UT, the RTNI of the first UT, and the IP address of the first UT. Essentially, the backend system determines that the RTNI of the first UT and the RTNI of the second UT are temporary IDs of two physical UTs associated with the same logical UT for subsequent RRC signaling handling and any data plane handling.

At 710, the backend system determines blockage data associated with one or more UTs in the set of UTs. Blockage data may comprise azimuth and elevation values associated with one or more obstructions. Blockage data may include blockage maps that indicate one or more blockage angles. Blockage maps may be computed by a processer associated with a UT or the blockage maps may be generated by the backend system based on information received from one or more UTs.

At 715, the backend system identifies a set of satellites. The set of satellites may be a part of a satellite network which provides one or more services. One or more satellites may orbit the Earth. At 720, the backend system determines satellite location information associated with one or more satellites within the satellite network. Satellite location information associated with one or more satellites may include predetermined coordinates associated with an orbital path of each satellite. For example, the backend system may store, within memory, predetermined coordinates associated with one or more satellites. Each satellite of a satellite network may travel in a predetermined path as it orbits the Earth. These predetermined coordinates may be recorded and utilized to determine when certain satellites are in the direct line of sight of particular UTs.

At 725, the backend system determines, based on blockage data and satellite location information, a first handover time to initiate handover for a first UT from a first satellite to a second satellite and a second handover time to initiate a handover for a second UT from the first satellite to the second satellite. The backend system may determine first and second handover times (i.e., when to initiate a handover) in order to mitigate service interruptions, blockages due to obstructions, and retracement. The backend system may determine, based upon blockage data associated with the first UT and satellite location information, when one or more satellites are accessible to the first UT. The backend system may also determine, based upon blockage data associated with a second UT and satellite location information, when one or more satellites are access to the second UT. Based, on the periods of accessibility for the first UT and the second UT, the backend system determines a first handover time for initiating the handover of the first UT from the first satellite to the second satellite and a second handover time for initiating the handover of the second UT from the first satellite to the second satellite. The backend system may mitigate retracement by preventing time periods for retracement and acquisition for the first UT and second UT from overlapping. Mitigation retracement may be achieved by staggering the handover periods associated with each UT. The backend system may also mitigate service interruptions, by utilizing blockage maps associated with each UT to determine instances where a satellite may be overhead, but is obstructed from view. Without the use of blockage maps, a handover of a UT may be initiated in an instance where a satellite should be available, according to satellite location information, but is actually obstructed from view. In such a scenario, the UT may fall into a RLF state and have a prolonged downtime, which is undesirable.

At 730, the backend system causes the first UT to initiate a satellite handover according to the first handover time. The backend system may transmit data, that when executed by one or more processors associated with the first UT, causes the first UT to initiate a handover process from the first satellite to the second satellite at a specific time. In one embodiment, the backend system may transmit a time value to the first UT, that when received by the first UT indicates to the first UT to initiate a handover process at a time that corresponds to the received time value.

At 735, the backend system causes the second UT to initiate a satellite handover according to the second handover time. The backend system may transmit data, that when executed by one or more processors associated with the second UT, causes the second UT to initiate a handover process from the first satellite to the second satellite at a specific time. In one embodiment, the backend system may transmit a time value to the second UT, that when received by the second UT indicates to the second UT to initiate a handover process at a time that corresponds to the received time value.

In one embodiment, one or more aspects of process 700 may be omitted. For example, processes associated with 710 may be omitted. In such an embodiment, the handover times may be determined such that there is no overlap. For example, a first handover time may always be "early" (i.e., while the first satellite is still available) and the second handover time may occur after the first handover time. Such a simplistic approach may save computing resources associated with determining blockage data such as blockage maps. A simplistic approach may be appropriate for systems with a small amount of satellites (e.g., 2 or less).

Figure 8:
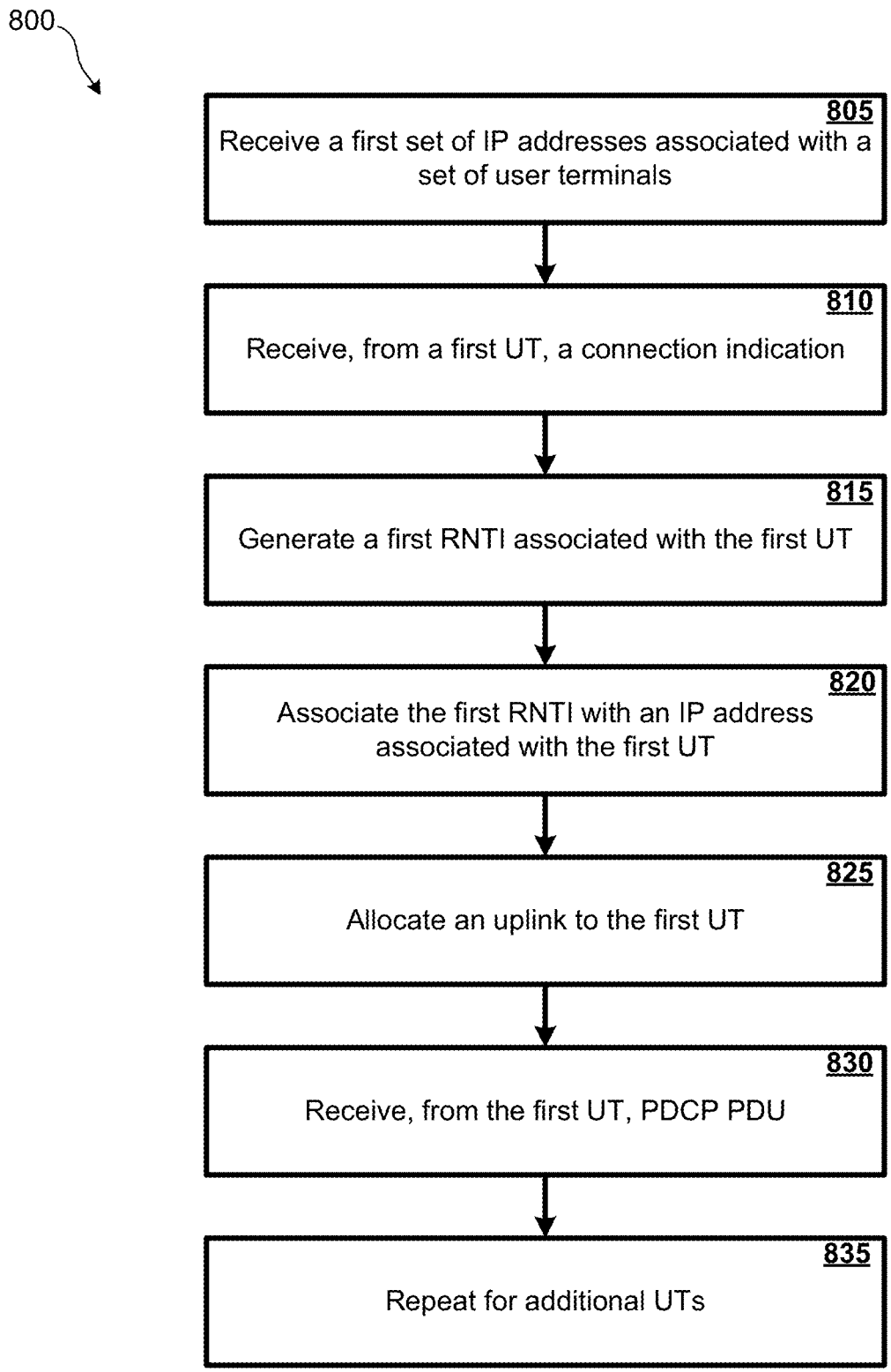
FIG. 8 illustrates a second process in accordance with one or more embodiments described herein.

FIG. 8 depicts example process 800 in accordance with one or more embodiments disclosed herein. Process 800 is a process for associating one or more physical UTs with a logical UT. One or more aspects of process 800 may be performed by a backend system associated with one or more UTs. For example, backend system 108 as depicted in FIG. 1 may perform one or more aspects of process 800. In one embodiments, one or more aspects of process 800 may be used in combination with other embodiments described. For example, one or more aspects of process 800 may be used to identify a set of UTs that are associated with a logical UT (e.g., 705 of FIG. 7).

At 805, the backend system receives a first set of IP addresses associated with a set of UTs. A processor associated with a particular UT may determine an IP addresses associated with itself. Furthermore, the processor associated with the particular UT may receive IP addresses associated with other UTs. In one embodiment, processers associated with each UT in the set of UTs may transmit a corresponding IP address to a master processor associated with the set of UTs. The master processor may then transmits a group of IP addresses associated with the set of UTs to the backend system as an application layer message. The backend system may then associate the received IP addresses with a logical identifier. In one embodiment, a set of UTs may be one or more UTs that are connected to the same cell tower and/or one or more UTs that are part of the same coverage area.

At 810 the backend system receives, from a first UT, a connection indication. The first UT may be one of the set of UTs from 805. The connection indication may be an indication that a session has been established between the UT and the backend system. In response to receiving the connection indication, at 815, the backend system generates a first RNTI associated with the first UT. The first RNTI is used to differentiate or identify a connected UT.

At 820 the backend system associates the first RNTI with an IP address associated with the first UT. The backend system binds the IP address associated with the first UT (received at 805) with the RNTI (generated at 815). Such a binding explicitly associates a temporary identifier of a UT with its corresponding IP address.

At 825, the backend system allocates an uplink to the first UT. The uplink may be a data path that is utilized by the first UT to transmit data to the backend system. At 830, the backend system receives, from the first UT, Packet Data Convergence Protocol (PDCP) Protocol Data Unit (PDU) .When received by the backend system, the PDCP PDU is associated with the RNTI of the first UT. As a result of mapping together the received PDCP PDU, RTNI, IP address, and the logical identifier, the first UT can be successfully identified as being part of a logical UT.

At 835, the backend system repeats one or aspects of process 800 for additional UTs. For example, aspects associated with 810-830 may be repeated for additional UTs such that additional UTs may be bound to a same logical identifier. Creating a logical UT from one or more physical UTs may have numerous advantages. Depending upon a number of UTs and the structure which they are mounted on (e.g., cell tower), more than one UT may have visibility to the same satellite at the same time. Furthermore, more than one UT may have visibility to one or more satellites at the same time. In either instance, the radio bearers associated with each UT may be simultaneously utilized (i.e., aggregated) to increase the throughput as single IP flow as opposed to utilizing each radio bearer individually.

Aside from increased throughput, another advantage of creating a logical UT may be blockage mitigation. For example, the backend system may detect a link failure due to a blockage of a first UT. If the first UT is part of a logical UT that comprises other UTs, the backend system may re-route traffic associated with the first UT to a different UT that is part of the same logical UT. The backend system may dynamically switch the UTs it uses to facilitate traffic based on the availability of a UT (e.g., satellite access based blockage data and satellite location information)

Figure 9:
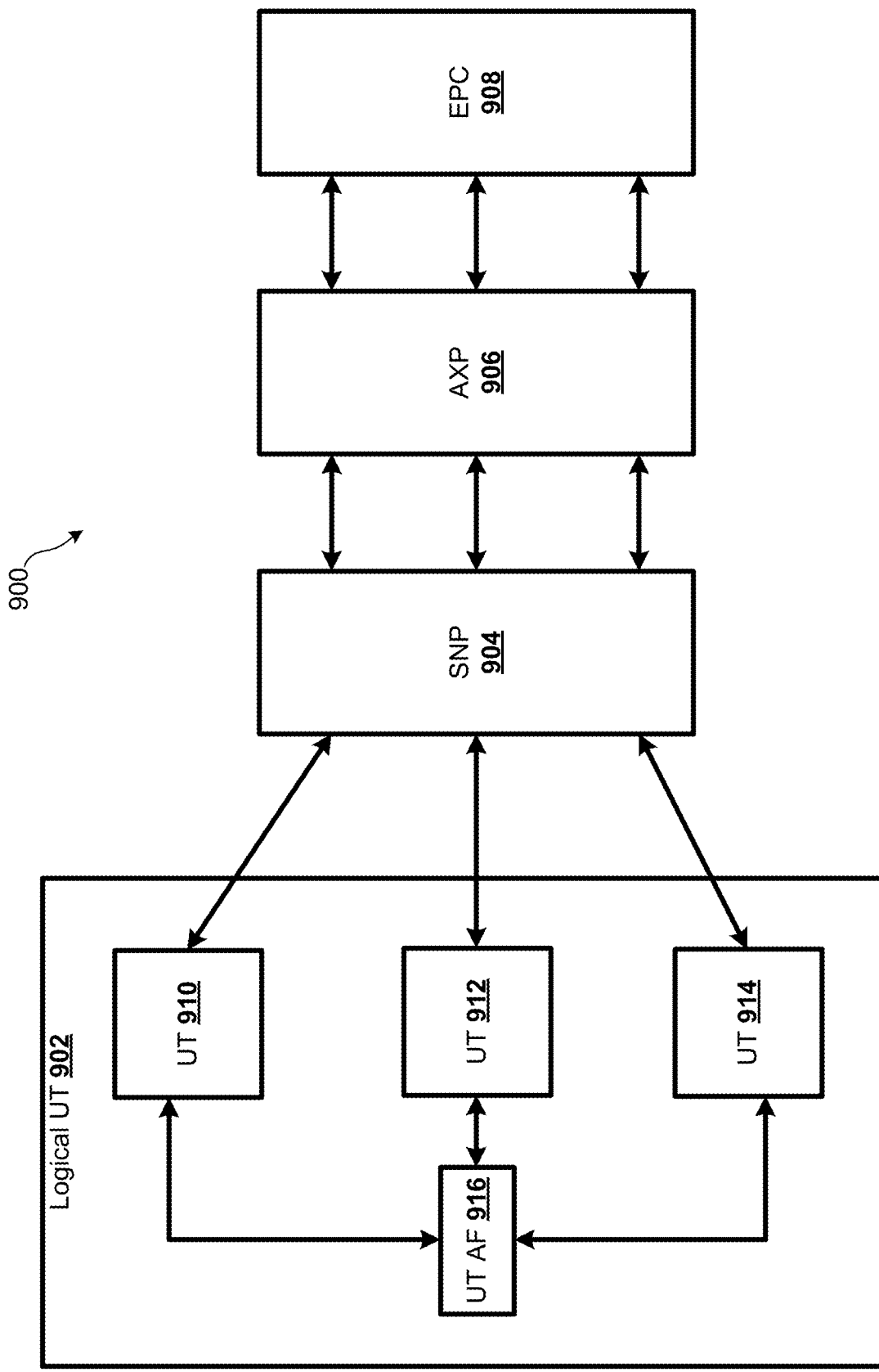
FIG. 9 illustrates an example network in accordance with one or more embodiments described herein.

FIG. 9 depicts system 900 according to one or more embodiments described herein. System 900 may be a system to implement a logical UT from a plurality of physical UTs. System 900 comprises logical UT 902, Satellite Network Processor (SNP) 904, Anchor Processor (AXP) 906, and Evolved Packet Core (EPC) 908. Logical UT 902 comprises UTs 910-914 and User Terminal Application Function (UT_AF) 916. UTs 910-914 may be physical UTs mounted to a same cell tower. UT_AF 916 may comprise of one or more processors and one or more memories. The one or more memories may store instructions, that when executed by the one or more processors, cause the one or more processors to perform operations to logically group together UTs 910-914 into logical UT 902. In one embodiment, UT_AF 916 may be a one or more sets of software that is implemented within one of UTs 910-914. In such an embodiment, UT_AF 916 may not comprise an individual physical processor and instead will utilize a processor associated with one of UTs 910-914. SNP 904 may establish one or more radio bearers for UTs 910-914. AXP 906 may retrieve or determine one or more blockage angles, satellite location information, and identifiers associated with UTs 910-914 in order to regulate the flow of traffic to queues in the Medium Access Control (MAC) layer at the times when one or more of UTs 910-914 would be blocked from receiving a satellite signal. For example, if AXP 906 determines that a blockage onset is approaching for UT 912, then it may route the flow of traffic to queues in the MAC layers associated with UT 910 and UT 914, which may avoid service interruptions with the unavailability of UT 912. Together SNP 904 and AXP 906 may form a Ground Node (GN).

AXP 906 may also mitigate potential out of order delivery issues when data packets are distributed using multiple paths (i.e., multiple radio bearers associated with different UTs). For example, certain data types (e.g., Quality of Service Class Identifier (QCI)) may be always transmitted on just one of the connected UT radio bearers and not split upon radio bearers of multiple connected UTs because order of, for example, Voice over Internet Protocol (VoIP) packets is important. In one embodiment, AXP 906 may perform one or more resequencing functions in order to ensure proper delivery and processing of out of order packets.

EPC 908 may be a device that provides converged voice and data on a 4G Long-Term Evolution (LTE) network. EPC 908 may comprise a Mobility Management Entity (MME) to manage session states and perform authentication of connected devices, Serving Gateway (SGW) which routes data packets through the network, Packet Data Node Gateway (PGW) which acts as an interface between the LTE network and other networks, manages quality of service (QoS), and provides deep packet inspection (DPI). EPC 908 may receive data packets from AXP 906 as an aggregated single IP flow instead of as multiple IP flows associated with different UTs. The single IP flow may comprise of information from multiple radio bearers associated with logical UT 902.

As shown by system 900, by grouping physical UTs (e.g., UTs 910-914) into a logical UT (e.g., logical UT 902), multiple radio bearers may simultaneously transmit data to SNP 904. SNP 904 may then relay that data to AXP 906 and AXP 906 may aggregate all or some of the received data, from the multiple radio bearers, into a single IP flow. AXP 906 may then transmit the single IP flow to EPC 908. As a result, increased data throughput may be achieved due to utilizing multiple radio bearers simultaneously and then aggregating data from those multiple radio bearers into a single IP flow.

Figure 10:
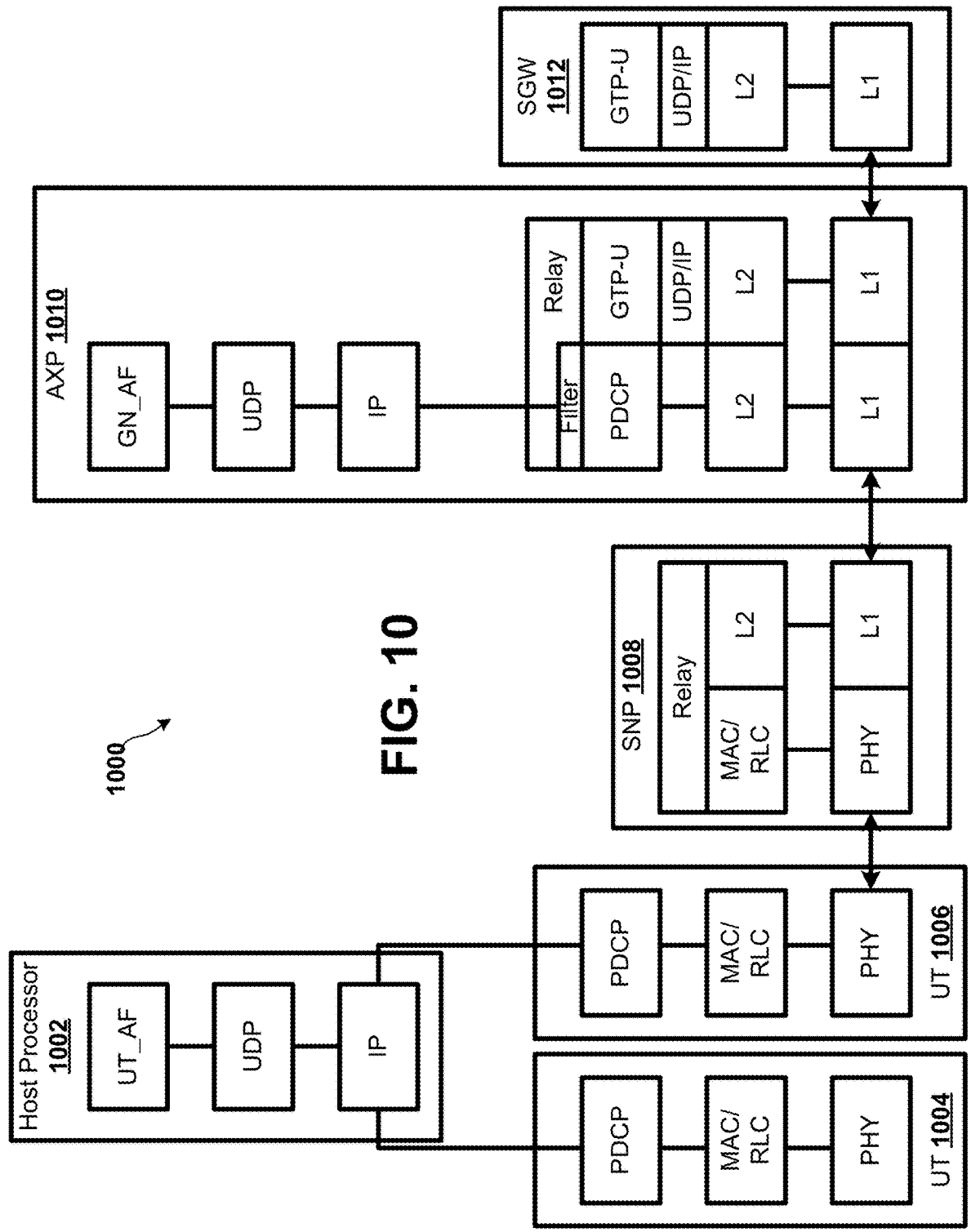
FIG. 10 depicts an example network in accordance with one or more embodiments described herein.

FIG. 10 illustrates system 1000 for creating a logical grouping of physical UTs. System 1000 may be a protocol stack for logically grouping multiple UTs. System 1000 may comprise of host processor 1002, UTs 1004-1006, SNP 1008, AXP 1010, and SGW 1012. As depicted in system 1000, host processor 1002 may handle layer 3 operations associated with UT 1004 and UT 1006. UT_AF may operate in an application layer and may transmit data according to the User Data Protocol (UDP) within the transport layer. The transport layer may provide logical communication between application processes operating on the application layer. The transport layer may convert received messages from the application layer (e.g., UT_AF) into data according to Internet Protocol (IP) within the network layer.

The network layer may provide logical communication between different devices (e.g., host processor 1002 and UTs 1004-1006). IP packets from host processor 1002 may be received by UT 1004 and UT 1006. Packet Data Convert Control (PDCP) of UTs 1004 and 1006 may be responsible for header compression of IP data packets, transfer of user plane data, transfer of control plane data, and the like. MAC/Radio Link Control (RLC) layer sits above the physical layer. The MAC layer is responsible for mapping between logical channels and transport channels. The RLC is responsible for transfer of upper layer (i.e., layer 3 and PDCP layer) protocol data units (PDUs). The MAC layer sits below the RLC layer. The physical layer sits below the MAC layer and carries all the information from MAC layer transport channels over air interfaces such as by Orthogonal Frequency Division Multiplexing (OFDM) and (Single Carrier-Orthogonal Frequency Division Multiplexing (SC-OFDM) and the like.

Data transmitted to the physical layers of UT 1004 and UT 1006 are transmitted and received by the physical layer (i.e., layer 1 (L1)) of SNP 1008. SNP 1008 may only operate in layer 2 and layer 1. SNP 1008 may also include a relay. A relay is acts as a low power base station to receive data from a one or more devices (i.e., UT 1004-1006) and relay that information via layer 2 (i.e., L2) and layer 1 protocols to another device (i.e., AXP 1010). Such a relay is useful in to enhance coverage areas (e.g., enhance cover area of AXP 1010). In one embodiment, SNP 1008 and AXP 1010 may be co-located and/or part of the same device, for example, a Ground Node (GN).

AXP 1010 includes GN_AF which may comprise of one or more processors and one or more memories. The one or more memories may store instructions, that when executed by the one or more processors, cause the one or more processors to perform operations to logically group together communications from UTs 1004-1006 and aggregate said communications into a single IP flow to SGW 1012. In one embodiment GN_AF may comprise of one or more logical instructions and may be implemented in software within one of the processors of AXP 1010. AXP 1010 may receive data from SNP 1008 and the received data may be converted from layer 1 data to layer 2 data and so forth up until the data is received at the application layer by GN_AF. GN_AF may logically identify data from UTs 1004-1006 as corresponding to the same logical UT. GN_AF may then relay this data via a GPRS Tunnel Protocol (GTP-U) to SGW 1012 as a single IP flow. As a result of the operations of the protocol stack depicted in system 1000 multiple UTs may be treated as a logical UT and communications from those multiple UTs may be aggregated into a single IP data flow.

Figure 11:
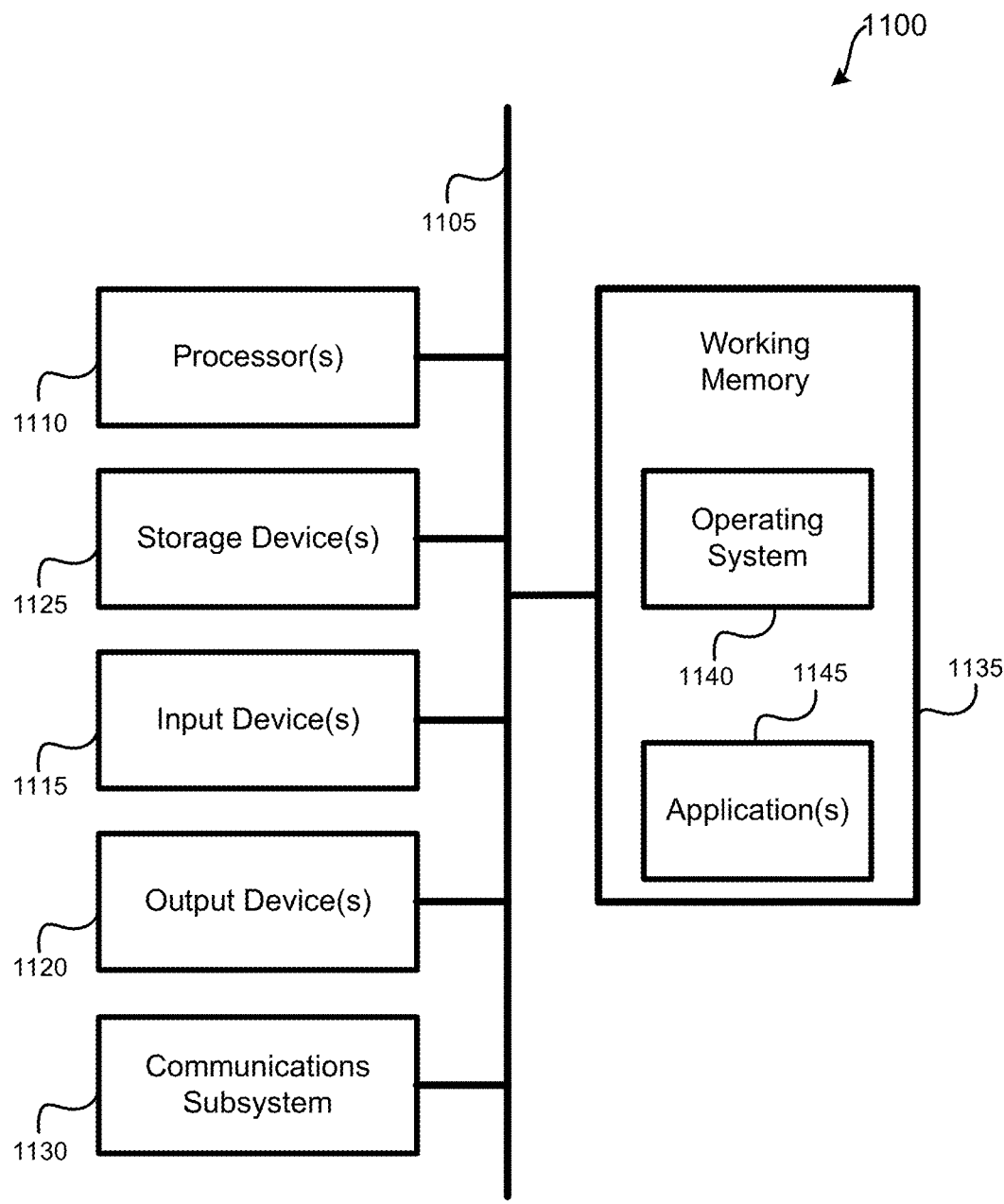
FIG. 11 illustrates an example computer system in accordance with one or more embodiments described herein.

FIG. 11 illustrates an embodiment of a computer system that may be incorporated as part of the backend system or one or more UTs. A computer system as illustrated in FIG. 11 may be incorporated as part of the previously described computerized devices, such as backend system 108 and UTs 104-106 as detailed in FIG. 1. FIG. 11 provides a schematic illustration of one embodiment of a computer system 11000 that can perform various steps of the methods provided by various embodiments described herein. It should be noted that FIG. 11 is meant only to provide a generalized illustration of various components, any or all of which may be utilized as appropriate. FIG. 11, therefore, broadly illustrates how individual system elements may be implemented in a relatively separated or relatively more integrated manner.

The computer system 1100 is shown comprising hardware elements that can be electrically coupled via a bus 1105 (or may otherwise be in communication). The hardware elements may include one or more processors 1110, including without limitation one or more general-purpose processors and/or one or more special-purpose processors (such as digital signal processing chips, graphics acceleration processors, video decoders, and/or the like); one or more input devices 1115, which can include without limitation a mouse, a touchscreen, keyboard, remote control, and/or the like; and one or more output devices 1120, which can include without limitation a display device, a printer, etc.

The computer system 1100 may further include (and/or be in communication with) one or more non-transitory storage devices 1125, which can comprise, without limitation, local and/or network accessible storage, and/or can include, without limitation, a disk drive, a drive array, an optical storage device, a solid-state storage device, such as a solid state drive ("SSD"), random access memory ("RAM"), and/or a read-only memory ("ROM"), which can be programmable, flash-updateable and/or the like. Such storage devices may be configured to implement any appropriate data stores, including without limitation, various file systems, database structures, and/or the like. For example, UT data storage 112 as depicted in FIG. 1 may be implemented by non-transitory storage devices 1125.

The computer system 1100 might also include a communications subsystem 1130, which can include without limitation a modem, a network card (wireless or wired), an infrared communication device, a wireless communication device, and/or a chipset (such as a Bluetooth™ device, BLE, an 802.11 device, an 802.15.4 device, a WiFi device, a WiMax device, cellular communication device, etc.), and/or the like. The communications subsystem 1130 may permit data to be exchanged with a network (such as the satellite network described herein, to name one example), other computer systems, and/or any other devices described herein. In many embodiments, the computer system 1100 will further comprise a working memory 1135, which can include a RAM or ROM device, as described above.

The computer system 1100 also can comprise software elements, shown as being currently located within the working memory 1135, including an operating system 1140, device drivers, executable libraries, and/or other code, such as one or more application programs 1145, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 1125 described above. In some cases, the storage medium might be incorporated within a computer system, such as computer system 1100. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 1100 and/or might take the form of source and/or installable code, which, upon compilation and/or installation on the computer system 1100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1100) to perform methods in accordance with various embodiments of the invention. According to a set of embodiments, some or all of the procedures of such methods are performed by the computer system 1100 in response to processor(s) 1110 executing one or more sequences of one or more instructions (which might be incorporated into the operating system 1140 and/or other code, such as an application program 1145) contained in the working memory 1135. Such instructions may be read into the working memory 1135 from another computer-readable medium, such as one or more of the non-transitory storage device(s) 1125. Merely by way of example, execution of the sequences of instructions contained in the working memory 1135 might cause the processor(s) 1110 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 1100, various computer-readable media might be involved in providing instructions/code to processor(s) 1110 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 1125. Volatile media include, without limitation, dynamic memory, such as the working memory 1135.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1100.

The communications subsystem 1130 (and/or components thereof) generally will receive signals, and the bus 1105 then might carry the signals (and/or the data, instructions, etc. carried by the signals) to the working memory 1135, from which the processor(s) 1110 retrieves and executes the instructions. The instructions received by the working memory 1135 may optionally be stored on a non-transitory storage device 1125 either before or after execution by the processor(s) 1110.

It should further be understood that the components of computer system 1100 can be distributed across a network. For example, some processing may be performed in one location using a first processor while other processing may be performed by another processor remote from the first processor. Other components of computer system 1100 may be similarly distributed. As such, computer system 1100 may be interpreted as a distributed computing system that performs processing in multiple locations. In some instances, computer system 1100 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

The invention claimed is:

1. A method for initiating handover of a user terminal comprising:
identifying a first user terminal of a set of user terminals;
determining first blockage data associated with the first user terminal, the first blockage data being associated with a physical structure;
identifying a first satellite of a set of satellites;
determining first satellite data associated with the first satellite, the first satellite data comprising at least satellite location information;
identifying a second satellite of the set of satellites;
determining second satellite data associated with the second satellite, the second satellite data comprising at least satellite location information, wherein the first satellite and second satellite are part of the same satellite network;
determining, by a backend system remote from the first user terminal, based at least in part on the first blockage data the first satellite data and the second satellite data, a handover time to initiate a satellite handover from the first satellite to the second satellite;
determining, by the backend system, second blockage data associated with a second user terminal, the second blockage data being associated with the physical structure, wherein the backend system is remote from the second user terminal;
determining, by the backend system, based at least in part on the handover time and the second blockage data, a second handover time to initiate a second satellite handover from the first satellite to the second satellite, wherein:
the second handover time is different from the handover time such that a first service outage of the first user terminal during the satellite handover does not overlap a second service outage of the second user terminal during the second satellite handover;
causing the first user terminal to initiate the satellite handover at the handover timer and
causing the second user terminal to initiate the second satellite handover at the second handover time.

2. The method of claim 1, wherein the set of user terminals are connected to the physical structure.

3. The method of claim 1, wherein the first blockage data comprises one or more blockage angles, wherein a blockage angle indicates an azimuth value and an elevation value associated with the physical structure.

4. The method of claim 1, wherein the first blockage data comprises one or more blockage angles, wherein a blockage angle indicates a pitch value, a yaw value, or a roll value associated with the physical structure.

5. The method of claim 1, wherein the first blockage data comprises a bitmap indicating one or more obstructions with respect to one or more azimuth values and one or more elevation values associated with the physical structure.

6. The method of claim 1, wherein determining, based at least in part on the handover time and the second blockage data, the second handover time to initiate the second satellite handover from the first satellite to the second satellite comprises:
generating a combined bitmap indicating one or more obstructions associated with the first user terminal and the second user terminal;
determining, based at least in part on the combined bitmap, a first accessibility data associated with the first user terminal and the first satellite and a second accessibility data associated with the second user terminal and the first satellite;
identifying, based at least in part on the first accessibility data and the second accessibility data, a time period when the first satellite is accessible to the first user terminal and the first satellite is not accessible to the second user terminal; and
determining, based at least on the time period, the second handover time.

7. A non-transitory processor-readable medium comprising processor-readable instructions that cause one or more processors of a backend system that is remote from a first user terminal and a second user terminal to:
identify the first user terminal of a set of user terminals;
determine first blockage data associated with the first user terminal, the first blockage data being associated with a physical structure;
identify a first satellite of a set of satellites;
determine first satellite data associated with the first satellite, the first satellite data comprising at least satellite location information;
identify a second satellite of the set of satellites;
determine second satellite data associated with the second satellite, the second satellite data comprising at least satellite location information, wherein the first satellite and second satellite are part of the same satellite network;
determine, based at least in part on the first blockage data the first satellite data and the second satellite data, a handover time to initiate a satellite handover from the first satellite to the second satellite;
determine second blockage data associated with the second user terminal, the second blockage data being associated with the physical structure;
determine based at least in part on the handover time and the second blockage data, a second handover time to initiate a second satellite handover from the first satellite to the second satellite, wherein:
the second handover time is different from the handover time such that a first service outage of the first user terminal during the satellite handover does not overlap a second service outage of the second user terminal during the second satellite handover;
cause the first user terminal to initiate the satellite handover at the handover time and
cause the second user terminal to initiate the second satellite handover at the second handover time.

8. The non-transitory processor-readable medium of claim 7, wherein the set of user terminals are connected to the physical structure.

9. The non-transitory processor-readable medium of claim 7, wherein the first blockage data comprises one or more blockage angles, wherein a blockage angle indicates an azimuth value and an elevation value associated with the physical structure.

10. The non-transitory processor-readable medium of claim 7, wherein the first blockage data comprises one or more blockage angles, wherein a blockage angle indicates a pitch value, a yaw value, or a roll value associated with the physical structure.

11. The non-transitory processor-readable medium of claim 7, wherein the first blockage data comprises a bitmap indicating one or more obstructions with respect to one or more azimuth values and one or more elevation values associated with the physical structure.

12. The non-transitory processor-readable medium of claim 7, wherein determine, based at least in part on the handover time and the second blockage data, the second handover time to initiate the second satellite handover from the first satellite to the second satellite, wherein the second handover time is different from the handover time further comprises:
   generate a combined bitmap indicating one or more obstructions associated with the first user terminal and the second user terminal;
   determine, based at least in part on the combined bitmap, a first accessibility data associated with the first user terminal and the first satellite and a second accessibility data associated with the second user terminal and the first satellite;
   identify, based at least in part on the first accessibility data and the second accessibility data, a time period when the first satellite is accessible to the first user terminal and the first satellite is not accessible to the second user terminal; and
   determine, based at least on the time period, the second handover time.

13. A system for initiating handover of a user terminal, comprising:
   one or more processors; and
   a memory coupled with the one or more processors, the memory configured to store instructions that when executed by the one or more processors cause the one or more processors to:
      identify a first user terminal of a set of user terminals;
      determine first blockage data associated with the first user terminal, the first blockage data being associated with a physical structure;
      identify a first satellite of a set of satellites;
      determine first satellite data associated with the first satellite, the first satellite data comprising at least satellite location information;
      identify a second satellite of the set of satellites;
      determine second satellite data associated with the second satellite, the second satellite data comprising at least satellite location information, wherein the first satellite and second satellite are part of the same satellite network;
      determine, based at least in part on the first blockage data the first satellite data and the second satellite data, a handover time to initiate a satellite handover from the first satellite to the second satellite;
      determine second blockage data associated with a second user terminal, the second blockage data being associated with the physical structure;
      determine based at least in part on the handover time and the second blockage data, a second handover time to initiate a second satellite handover from the first satellite to the second satellite, wherein:
         the second handover time is different from the handover time such that a first service outage of the first user terminal during the satellite handover does not overlap a second service outage of the second user terminal during the second satellite handover;
      cause the first user terminal to initiate the satellite handover at the handover time; and
      cause the second user terminal to initiate the second satellite handover at the second handover time.

14. The system of claim 13, wherein the set of user terminals are connected to the physical structure.

15. The system of claim 13, wherein the first blockage data comprises one or more blockage angles, wherein a blockage angle indicates an azimuth value and an elevation value associated with the physical structure.

16. The system of claim 13, wherein the first blockage data comprises one or more blockage angles, wherein a blockage angle indicates a pitch value, a yaw value, or a roll value associated with the physical structure.

17. The system of claim 13, wherein the first blockage data comprises a bitmap indicating one or more obstructions with respect to one or more azimuth values and one or more elevation values associated with the physical structure.

* * * * *